Jan. 9, 1951　　E. J. JOBLING-PURSER ET AL　　2,537,465
MANUFACTURE OF LARGE GLASS STRUCTURES, IN PARTICULAR
ASTRONOMICAL TELESCOPE MIRRORS
Filed July 16, 1949　　2 Sheets-Sheet 1
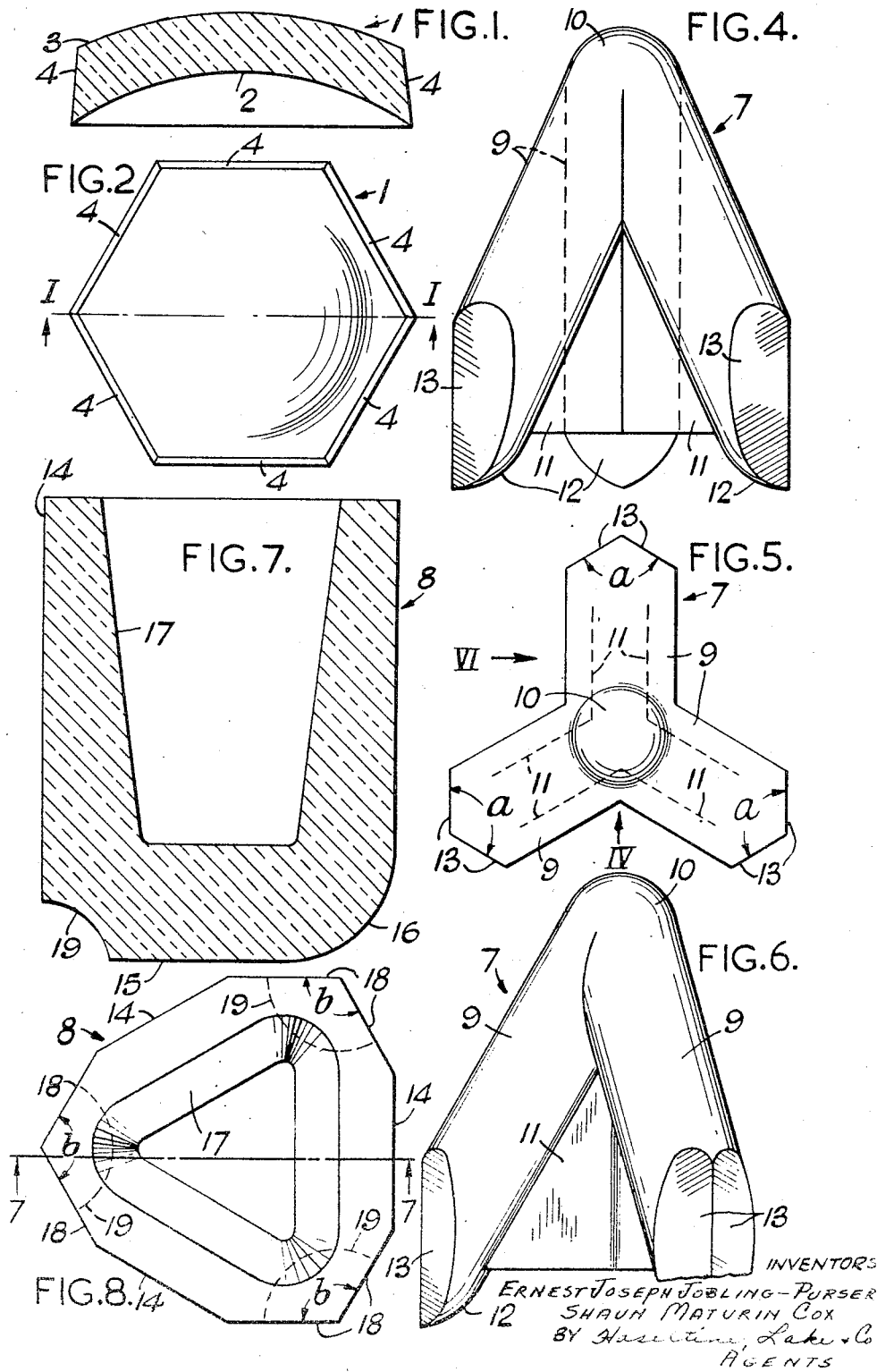
INVENTORS
ERNEST JOSEPH JOBLING-PURSER
SHAUN MATURIN COX
BY Haseltine, Lake & Co
AGENTS

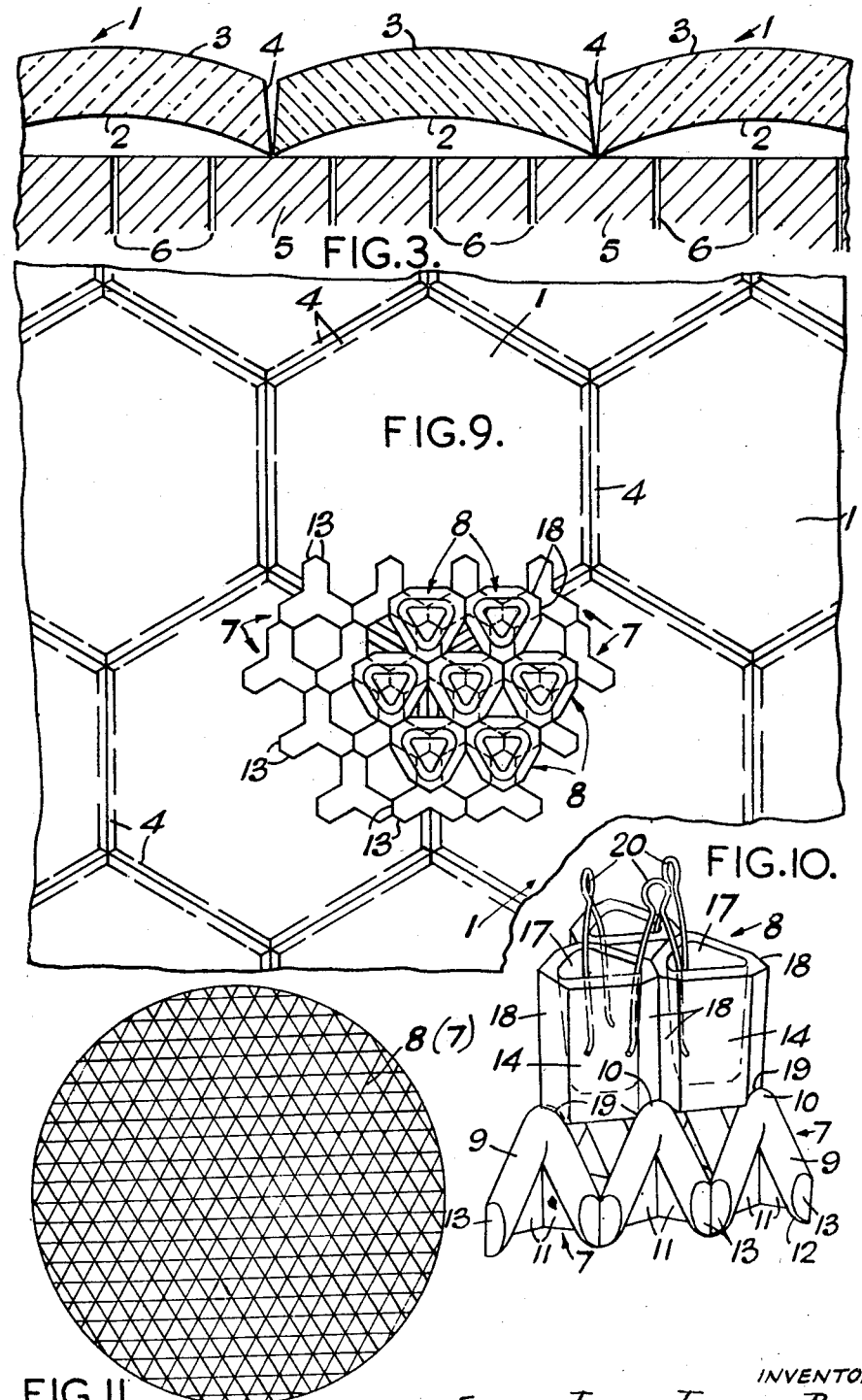

Patented Jan. 9, 1951

2,537,465

UNITED STATES PATENT OFFICE 2,537,465

MANUFACTURE OF LARGE GLASS STRUCTURES, IN PARTICULAR ASTRONOMICAL TELESCOPE MIRRORS

Ernest Joseph Jobling-Purser, Burdon Hall, near Sunderland, and Shaun Maturin Cox, Westoe Village, England, assignors to James A. Jobling & Company Limited, Sunderland, England, a company of Great Britain Application July 16, 1949, Serial No. 105,142
In Great Britain April 22, 1948

14 Claims. (Cl. 49—82)

The invention relates to the manufacture of astronomical telescope mirrors and other large and integrate glass structures.

The problems which it is the aim of the invention to solve have arisen chiefly out of investigations made in connection with the fabrication of astronomical telescope mirrors and, for simplicity, the invention will be described in that connection. It is to be understood, however, that this does not imply limitation of the invention to that field alone.

It is well known that the extent of the field of the astronomer's enquiry is set by the aperture of his telescope and in fact both the light collecting power and the detail of what can be seen or photographed is set by the size of the mirrors or lenses of the telescope. Because of the difficulty of obtaining large optically homogeneous pieces of glass, it has become the practice to use mirrors exclusively as then the optical requirements are reduced to the necessity of perfection in surface contour for reflection, the material part of the mirror simply serving as a support for this reflecting surface.

In general, imperfections in this surface contour exceeding about 2 millionths of an inch are intolerable, and because this degree of perfection must be maintained under all the changing conditions of support and of temperature while the telescope traverses the sky, the support for the reflecting surface must conform to the most exacting conditions of rigidity and thermal and temporal stability.

As far as stability is concerned considerations such as the smallness of the thermal expansion coefficient together with the exclusion of any possibility of equilibrium changes and the need for a perfect surface polish, have indicated that the material best suited to the making of the mirror is glass.

To maintain adequate rigidity it is found that, as the diameter of the mirror is increased, the supporting thickness must also be increased, and for the larger mirrors the glass manufacturer's task of casting becomes formidable. Apart from the detailed difficulties of producing and casting large homogeneous melts of glass, the interruption of normal routine operations in the glasshouse makes such an undertaking a very expensive one to the glass manufacturer.

There is moreover an intrinsic difficulty in connection with such large mirrors. The conditions for rigidity and for thermal stability become ever more conflicting as the dimensions increase. Thick sections are necessary for rigidity, but thick sections are detrimental to the disc becoming uniform in temperature as the ambient temperature changes. Any lack of uniformity in temperature will be apparent as a temporary warping of the disc, and so long as such distortion is present the figure of the mirror is inaccurate. Under observatory conditions it is impossible to maintain uniform ambient temperature, for the mirror must be exposed to the sky—usually at a site such as a mountain top, where extremes of day and night temperature arise. A mirror of 2" sectional thickness may take two or three hours to acquire "night temperature." A mirror of twice this thickness will take four times as long to acquire "night temperature"—so that there is little time to make observations before dawn.

Suggestions have been made and experiments have been carried out and published with regard to the partial solution of this problem. Thus the 200" disc at present under trial at Mount Palomar was cast with a ribbed structure at its back. Such a large intricate casting was exceedingly costly to manufacture and was only successfully cast at the second attempt.

Experiments carried out in France were based on the formation of a composite mirror made by joining together two large plates of glass, separated by glass spacer pieces. The joints were made to adhere by the use of cement of unspecified nature, and the use of such cement throws doubt on the permanency and stability of such a mirror.

A somewhat similar arrangement was resorted to by Sir Charles Parsons, who, however, caused the joints to sinter together by heating the whole, the warping of the back plate being reduced by supports afterwards removed. His mirror showed small cracks at some of the joints—possibly the result of devitrification of the glass.

In these composite mirrors it was envisaged that the air would permeate between the front and back plates and so assist in bringing the glass to uniform temperature. Because of the continuity of the back plate, however, the air is liable to become stagnant and itself acquire temperature gradients. So far as we are aware neither of these composite mirrors reached the stage of actual trial in a telescope.

In all cases the problem of producing a satisfactory large front plate still rests with the glass maker, and because the only manufacturers equipped to make large diameter plates have been plate glass makers it has been necessary to make these mirrors from plate glass which has a thermal expansion coefficient of about $9 \times 10^{-6}$ per °C., or some three times greater than that of more appropriate glasses such as "Pyrex" brand glass. The gain in thermal response obtained in design has therefore been largely off-set by the use of material of high expansion.

We have devoted our attention to the development of a technique which would enable us to manufacture mirror blanks which:

(a) Would have adequate rigidity.

(b) Would have rapid temperature response.

(c) Would involve the least disruption to standard glass-house practices.

(d) Would not suffer from any liability to deteriorate with time.

In order to comply with (c) it was decided to design a composite mirror blank, the pieces of which could be pressed in the conventional manner, in "Pyrex" brand glass.

The advantages of so doing are as follows:

(1) The glass for the individual pressings being gathered from a large tank of molten glass under well established conditions of control would exhibit a constancy in composition from one pressing to another, unachievable were the glass melted for each individual pressing.

(2) Any piece containing a flaw could be excluded without condemning a large weight of glass as would be the case if the mirror blank were cast as one piece.

In order to comply with (d) it was decided that the pieces should be joined together by sintering without the use of a cement, so that the mirror when completed would be integrated into a single glass structure.

In order to comply with (a) and (b) the rear of the mirror must have adequate overall thickness, and must have an openwork structure allowing of the free circulation of air, yet the various parts must be so interconnected as to ensure rigidity. The parts should at no place have great thickness and there should be a high proportion of void volume to reduce weight.

It was by no means obvious that such conditions could be met. By preliminary experiments it was necessary to ascertain whether:

(1) A structure of contacting parts could be made to fuse together at the contacts by uniformly heating the whole without (a) the whole softening to the extent that the structure would collapse or (b) the glass devitrifying under the action of the heat, and developing flaws from the crystalline products of devitrification.

(2) A continuous front plate could be formed by heating together smaller pieces in approximate contact.

It was further appreciated that in view of the close heating control which would obviously be necessary, it was to be desired that both these processes—the forming of the front plate and the forming of the rear openwork structure—should be accomplished in an electric furnace of the resistor type, and that, on the grounds of economy, the electric elements should be inexpensive. In short, it was desirable that the fusion should be accomplished at temperatures less than 1100° C., a maximum set by the top working temperature of base metal resistor wires.

Having now outlined the difficulties to be overcome, we give below the methods by which we have achieved our object.

Measurements carried out on the viscosity of the glass and upon the rate of crystal growth arising from devitrification showed that while both depend on the temperature, the mobility (i. e. the reciprocal of the viscosity) increases at a relatively greater rate with respect to temperature increase than does the crystal growth velocity. As we wish glass sections in contact to seal together—the facility for so doing is measured by the mobility—while avoiding crystalline growth, it is evident that such an operation will be favoured by using as high a temperature as may be consistent with our other requirements. It became evident, however, that the consideration that the structure should not collapse could only be met if the temperature were controlled below that point at which troubles from crystallisation were still to be feared.

As it is from the front plate that the final precise contour must be formed by grinding and polishing, it is essential that a homogeneous and continuous plate of the requisite diameter shall be formed, and to overcome the manufacturing difficulties before referred to, it is necessary in the larger mirror to make this from smaller pieces. Furthermore to minimise the cost and labour of grinding, it is desirable that the contour of this plate should conform approximately to that finally required.

It is necessary that the seams joining the pieces be substantially complete and free of any marked and continuous grooves as the asymmetric rigidity resulting from such lack of uniformity of structure would result in distortion.

On the grounds of economy of moulding equipment it is desirable that all the pieces going to make up the plate should have the same shape. There are, of course, many polygonal shapes (for example, triangular, rectangular and hexagonal) which are mutually self fitting. We find that, on the grounds of simplicity, ease of forming and because it leads to disrupture seams, a hexagonal form is to be recommended.

We further find—and in this resides a particular feature of our technique—that if this polygonal piece in the course of its initial formation be caused to have a concave face, and that if the sides be tapered back so that the area of the face which is concave is greater than that of the reverse side which is convex, and that if the amount of taper is so chosen that the total volume of the glass is substantially equal to or slightly greater than the volume which would be occupied by a like polygonal piece of the same front side length and of the same thickness if the faces were both plane and the sides untapered, then such a piece, if placed with its edges in contact with the appropriate number of other pieces of like shape concave side downwards on a refractory plate through which holes are arranged to allow of the expiry of air, the assembly will, when heated to a sufficiently high temperature, soften and collapse on to the refractory plate and in the process of so doing the seams between pairs of pieces will seal up progressively from the bottom upwards without the inclusion of large air bubbles or blisters.

We find that substantially continuous plates showing only immaterial evidence of their discrete form may be made in this manner. The irregular boundary to such plates may be rendered circular either by subsequent cutting or by cutting such individual polygonals as may be necessary to conform with the required boundary before the fusion operation.

The refractory plate upon which the pieces rest during fusion may be shaped to the approximate contour to which it is required that the plate shall conform and if this is of great curvature the straight sides to the polygonal must be modified to have a curved shape so that when they are laid upon the refractory they lie in closer juxta-position.

Assuming the preformation of the plate, a further feature of our invention resides in increasing the rigidity of the plate by sealing thereto a system of interconnected parts to constitute a reinforcement and there is evidently an infinite variety of designs which would achieve the purpose.

We propose to describe one such design in detail without implying that our technique is limited to such—the essential feature of our reinforcing technique lying in that the reinforcing parts are so shaped that when placed in position on the preformed plate and heated in a furnace they do not tend substantially to lose that shape, or when they do so, the loss of shape is such as to bring those parts which are to be fused together into more intimate contact, and further that the resultant forces due to the weight of the parts themselves or to the action of spring pressure are such as to aid the sealing together of the contacting parts under the action of heat.

To assist in a clear understanding of our invention we now make reference to the accompanying drawings, in which:

Figure 1 is a cross-sectional view of one of the several glass polygonal pieces used in making a mirror blank, the view being taken on the line I—I in Figure 2;

Figure 2 is a plan view corresponding to Figure 1;

Figure 3 is a sectional view illustrating several of the polygonal pieces arranged in juxtaposition on a refractory support prior to heating;

Figure 4 is a side elevational view to an enlarged scale of one of a plurality of glass tripods used as part of a reinforcement of the mirror blank made from the aforesaid pieces, the view being taken from the direction of the arrow IV in Figure 5;

Figure 5 is a plan view corresponding to Figure 4;

Figure 6 is a side elevational view looking in the direction of the arrow VI in Figure 5;

Figure 7 is a vertical sectional view taken on the line 7—7 of Fig. 8 of one of a plurality of glass cups adapted to be applied to the tripods of Figures 4 to 6 as a further part of the reinforcement;

Figure 8 is a plan view corresponding to Figure 7;

Figure 9 is a plan view illustrating the mirror blank with the reinforcement constituted by the tripods of Figures 4 to 6 and cups of Figures 7 and 8 applied thereto;

Figures 10 is a perspective view illustrating the mounting of the cups on the tripods, and Figure 11 is a diagrammatic plan view having for its purpose to give an idea of the sizes of the tripods and cups relatively to the mirror blank as a whole.

As illustrated in Figures 1, 2, 3 and 9, each glass piece 1, from a plurality of which the mirror blank is formed, is formed by pressing or moulding and is of hexagonal shape in plan. The piece is initially formed with a concave face 2 and a convex face 3, the sides 4 of the hexagonal being tapered back so that the area of the concave face 2 is greater than the area of the convex face 3. In a specific instance, the piece can be of such a size that the apices of its sides 4 at the points where they meet the concave face 2 touch an imaginary circle of six inches radius, the piece being two inches thick at its vertical centre and the concave and convex faces each being curved to a radius of thirteen and three-quarter inches in the section which cuts the piece through opposite corners as indicated by the line I—I in Figure 2, and a radius of ten-and-one-half inches in the section which cuts the piece so as to bisect perpendicularly the opposite pairs of straight edges. With these dimensions, a tapering back of the sides 4 at an angle of 6° from the vertical is found satisfactory. These dimensions are given by way of example only and are not to be regarded as limitative.

As illustrated in Figure 3, a plurality of the pieces described with reference to Figures 1 and 2—the number depending on the ultimate size of the mirror blank to be made—are placed upon a plate 5 of refractory material with the concave face 2 nearest the plate, the pieces being so arranged that the lower edges of their sides 4 fit against one another somewhat after the manner of honeycomb. Heat is now applied for softening the pieces sufficiently to cause them to collapse on to the plate, such collapsing resulting also in the sides 4 losing their taper so that the sides of one piece come into full contact with the sides of adjacent pieces and become fused together. Holes 6 are provided through the plate 5 to allow air trapped in the cavities formed between the upper surface of the plate and the concave faces of the pieces 1, to escape as the pieces collapse on to the plate. The upper surface of the refractory plate 5 on which the pieces rest is, for illustrative purposes, shown to be flat so that the mirror blank formed by the collapsed and amalgamated pieces 1 will have an operative surface of corresponding flat form for final grinding and polishing. Figure 9 will serve to demonstrate how the pieces 1 are fitted together honeycomb fashion prior to heating as already explained, although this figure is intended to show the pieces in collapsed and amalgamated condition to constitute the mirror blank. For illustrative purposes Figure 9 includes broken lines 4 which are intended to indicate the taper which was initially present in the sides 4 of the pieces 1 but which has disappeared in the collapsing of the pieces on to the refractory plate 5 and the consequent bringing of the sides into full contact with each other.

The shape at the boundary of the formed mirror blank can be governed by using at the boundary pieces 1 which are of only part-hexagonal shape or are of full hexagonal shape and are trimmed down after the joining operation.

The reinforcement for the back of the mirror blank formed as explanied with reference to Figures 1, 2, 3 and 9 will now be described. The reinforcement consists of two layers of elements, the first of these being in the form of glass tripods adapted to rest on and be fused to the rear surface of the mirror blank and the second being in the form of glass cups adapted to rest on and be fused to the heads of the tripods. The tripods are generally indicated at 7 in the drawings and the cups are generally indicated at 8.

One of the tripods is illustrated in Figures 4 to 6. It is formed by moulding and has three symmetrically arranged splayed legs 9 each of substantially circular cross-section, the legs being united at the top in such a manner as to provide a substantially hemispherical seating 10. The legs are joined by webs 11 the lower ends of which terminate above the lower ends of the legs. The inner part of the lower extremity of each leg is formed as part of a sphere as indicated at 12, while the outer part of the lower extremity is formed with two chamfers 13 disposed vertically and extending in different angular planes so that they lie at an angle of 120° to each other as indicated by the arrow line $a$ in Figure 5. With this arrangement, when a plurality of the tripods is set up on the back surface of the mirror blank with the legs of one in contact with the legs of another, the chamfers 12 on the legs of one tripod will mate snugly with the chamfers on the legs of adjacent tripods, the contacting legs together providing a substantially hemispherical surface in contact with the mirror blank—this surface albeit being divided into three segments. Figure 9 clearly demonstrates the mating arrangement of the tripods.

One of the cups 8 constituting the second layer of the reinforcement is illustrated in Figures 7 and 8. The cup is made by moulding and is of substantially triangular shape in plan with vertical flat sides 14 and a flat base 15 into which the sides curve as indicated at 16 in Figure 7, the cavity 17 in the cup being tapered inwardly towards the bottom. Each corner of the triangle is formed with two chamfers 18 disposed vertically and extending in different angular planes so that they lie at an angle of 120° to each other as indicated by the arrow lines $b$ in Figure 8. With this arrangement, when a plurality of the cups is placed together corner to corner, the chamfers 18 of adjoining cups will mate snugly with each other as indicated in Figures 9 and 10. A recess 19 is provided at the bottom of each pair of chamfers 18, the recess conforming to a part of a sphere whose radius is slightly larger than that of the part-spherical seating 10 at the top of the tripod 7. Each cup 8 is made to lateral dimensions such that when a plurality of the cups is placed corner to corner with their chamfers 18 mating, the three recesses 19 at each mating corner will together produce a substantially hemispherical depression in which the substantially hemispherical head 10 of a tripod 7 can fit. In this way, when the tripods 7 have been correctly sited in contact on the rear face of the mirror blank and the cups 8 have been correctly arranged in contact with each other and in engagement with the heads 10 of the tripods beneath them, one set of reinforcements will act to locate the other. The nature of the engagement between the several parts is clearly depicted in Figure 10.

With the reinforcing layers constituted by the tripods and cups applied to the mirror blank as described and with the mirror blank resting on the refractory plate 5 or a similar support, the whole assembly is heated to a degree sufficient to cause the tripods to be fused to each other and to the mirror blank and the cups to be fused to each other and to the tripods.

The reinforcement constituted by the tripods and cups at the back of the plate endows the latter with all necessary strength and resistance to distortion without increasing the total bulk of the plate excessively. At the same time the arrangement of tripods and cups provides a plurality of cells at the back of the plate through which air can freely pass. These factors together will ensure that the plate will quickly respond to changes of ambient temperature.

Figure 11 is a plan view depicting a mirror blank of twenty inches in diameter, the crossing lines in the figure being intended to indicate the cups 8 and the underlying tripods 7 of the reinforcement. This figure is included merely to give some idea of the size of the cups and tripods relatively to a mirror blank of the diameter just stated.

With such a design of reinforcement and because of the splaying of the legs of the tripods when under the softening action of heat, the tripods tend to squat under their own weight and under the weight of the superimposed layer of cups and in so doing the adjacent surfaces are driven into contact with each other and into contact with the mirror plate, thereby promoting the joining operation.

Because, during the fusing operation, there is little force tending to unite the contacting surfaces of the cups, spring clips 20 may with advantage be applied to the cups as indicated in Figure 10, each clip spanning the two walls of neighbouring cups, amounting to three clips for each cup. It is found that such clips if of suitable material such as nichrome wire may be removed after the fusion operation without damage to the glass.

While the design of the components of the reinforcing structure is important, a factor contributing to the success of its application to the mirror blank is the skill exercised during the fusing operation. Because of the danger of devitrification it is necessary that all parts of the structure should be brought rapidly to the fusing temperature, and maintained there only just so long as to permit the desired degree of squatting of the tripods.

When the glass is "Pyrex" brand glass there is little risk of either devitrification or warping at temperatures below 600° C. The parts may therefore be heated slowly until this temperature is reached and so any risk of breakage by thermal shock can be avoided. Thereafter, because the viscosity has decreased, there is little risk of thermal breakage and therefore the temperature should be rapidly raised to about 830° C. As at this temperature the squatting rapidly takes place, no time can be allowed for the whole structure to become uniform in temperature, but rather the temperature must be rapidly reduced to "set" the structure and allay the squatting.

It is of importance therefore that the method of heating should be so devised that there are no great temperature differences throughout the structure. We find that by lining the furnace walls with numerous electrically heated wires so that the heat is supplied substantially as radiant energy, such natural temperature gradients may be reduced to tolerable proportions.

We claim:

1. Method of manufacturing glass plates which resides in providing a plurality of glass pieces each of polygonal shape and with a concave face and having its sides tapered back so that the area of the concave face is greater than that of the opposite face, placing such pieces on a refractory support with their edges in contact with each other and with their concave faces nearest the support, and heating the assembly to cause the pieces to soften and collapse on to the support and the sides of one piece concomitantly to come into engagement with the sides of adjacent pieces so that such sides will be joined together from the bottom upwards.

2. A method according to claim 1, wherein each piece has a convex face opposite the concave face.

3. A method according to claim 1 wherein each piece is of hexagonal shape.

4. A method according to claim 1, wherein the refractory support is perforated to allow of escape of air occluded between the concave faces of the pieces and the adjacent face of the support when the pieces collapse.

5. A method of manufacturing a glass plate, including the step of applying a reinforcement to the back of the plate formed by the method claimed in claim 1.

6. A method of manufacturing a glass plate which resides in providing a plurality of glass pieces each of polygonal shape and with a concave face and having its sides tapered back so that the area of the concave face is greater than that of the opposite face, placing such pieces on a refractory support with their edges in contact with each other and with their concave faces lying nearest the support, heating the assembly to cause the pieces to soften and collapse on to the support and the sides of one piece concomitantly to come into engagement with the sides of adjacent pieces so that such sides will be joined together from the bottom upwards thereby forming an integrated plate, and applying a reinforcement to the back of the integrated plate, the reinforcement consisting of two layers, one layer being made of glass tripods resting on the rear face of the plate, and the other layer being made up of glass cups resting on the tripods.

7. A method according to claim 6, wherein heat is applied to the assembly of plate, tripods and cups to cause the tripods to be fused to each other and to the plate and the cups to be fused to each other and to the tripods.

8. A method according to claim 6, wherein each tripod has three splayed legs united at the top to provide a substantially hemispherical seating for the purpose described.

9. A method according to claim 6, wherein each tripod has three splayed legs united at the top to provide a substantially spherical seating, the legs being joined by webs the lower ends of which terminate above the lower ends of the legs.

10. A method according to claim 6, wherein each tripod has three splayed legs united at the top to provide a substantially spherical seating, the lower extremity of each leg being formed as part of a sphere.

11. A method according to claim 6, wherein each tripod has three splayed legs united at the top to provide a substantially spherical seating, the outer part of the lower extremity of each leg being formed with two chamfers for the purpose described.

12. A method according to claim 6, wherein each cup is of substantially triangular shape in plan, each corner of the triangle being formed with two chamfers for the purpose described.

13. A method according to claim 6, wherein each cup is of substantially triangular shape in plan, each corner of the triangle being formed with two chamfers, and a recess conforming to part of a sphere is provided at the bottom of each pair of chamfers for the purpose described.

14. A method according to claim 6, including the step of applying spring clips to the cups to hold them together on the tripods and then applying heat to the assembly of plates, tripods and cups to cause the tripods to be fused to each other and to the plate and the cups to be fused to each other and to the tripods, the spring clips being thereafter removed.

ERNEST JOSEPH JOBLING-PURSER.
SHAUN MATURIN COX.

REFERENCES CITED

The following references are of record in the file of this patent:

UNITED STATES PATENTS

| Number | Name | Date |
| --- | --- | --- |
| 519,186 | Hughes | May 1, 1894 |
| 1,206,177 | Twyman, et al. | Nov. 28, 1916 |